March 12, 1957  W. A. DAVIS  2,784,703
HYDRAULIC DISTANT PRECISION MOVEMENT CONTROL DEVICE
Filed March 8, 1954  2 Sheets-Sheet 2
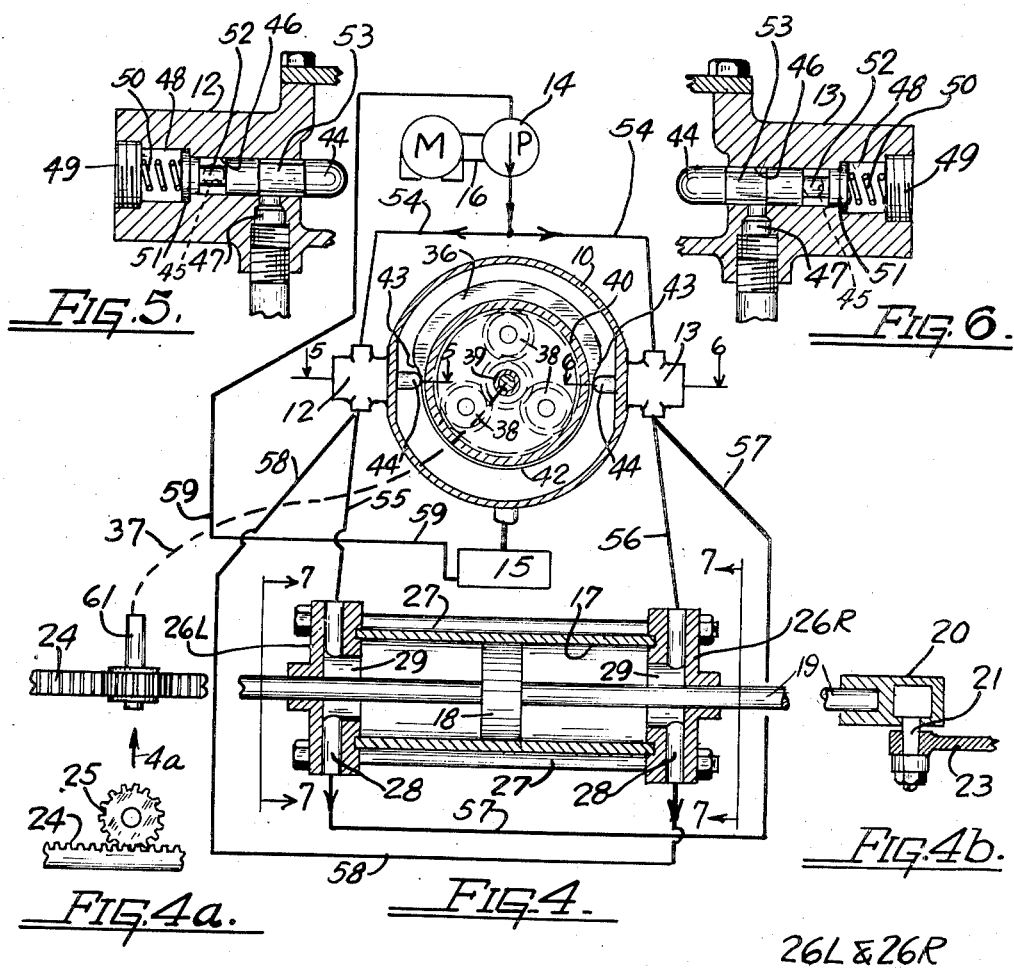
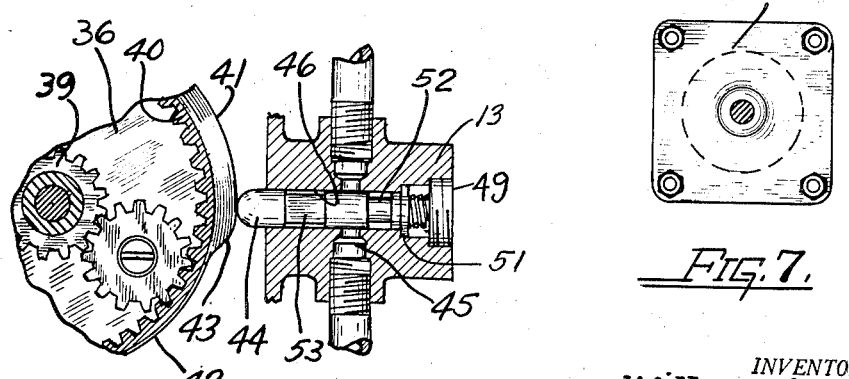
INVENTOR.
William A. Davis
BY
Martin E. Anderson
ATTORNEYS United States Patent Office 2,784,703
Patented Mar. 12, 1957

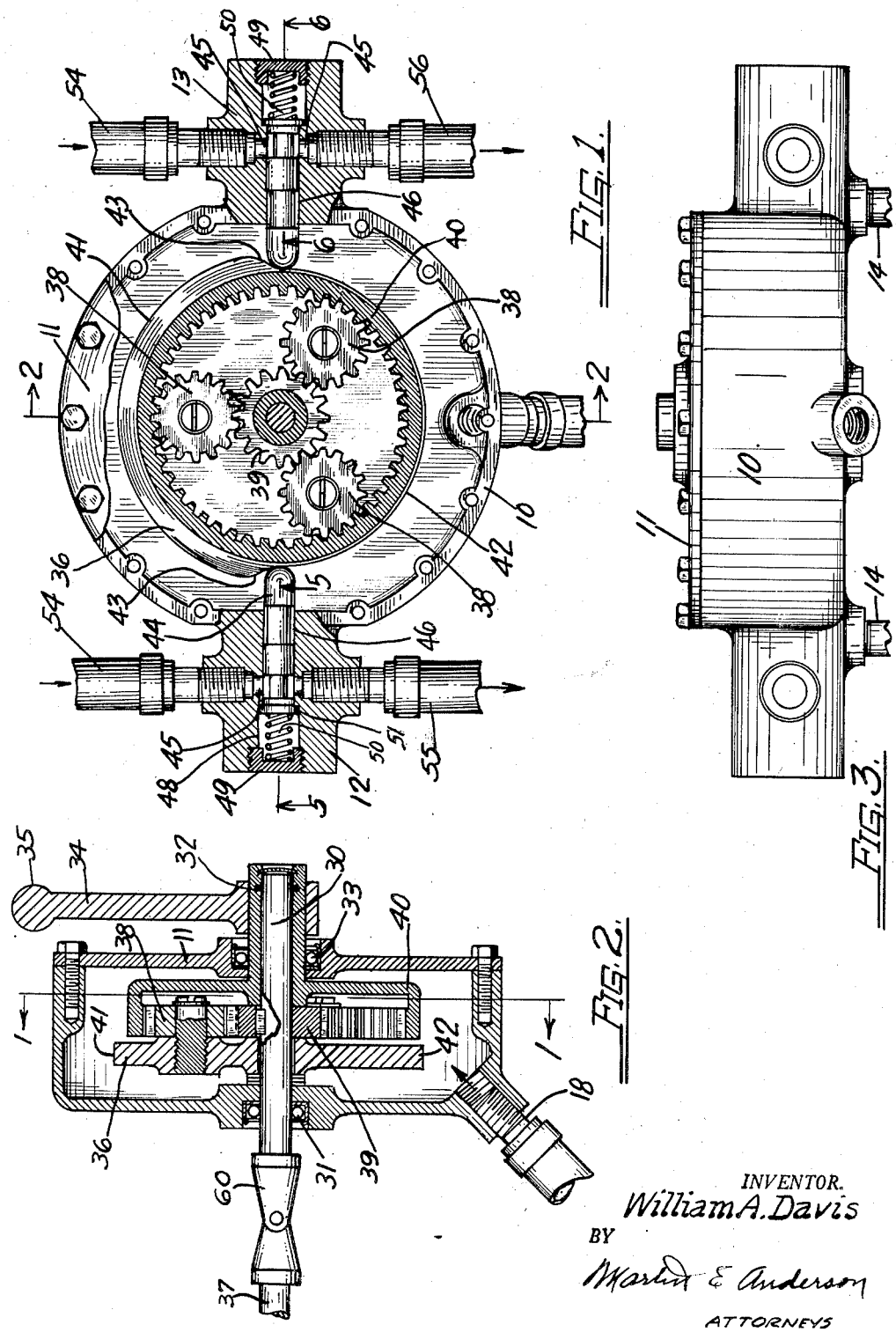

2,784,703

HYDRAULIC DISTANT PRECISION MOVEMENT CONTROL DEVICE

William A. Davis, Fort Lupton, Colo.

Application March 8, 1954, Serial No. 414,591

1 Claim. (Cl. 121—41)

This invention relates broadly to hydraulic remote control devices whereby an operator can produce a precision movement of an apparatus at some distance, and has reference more particularly to a hydraulic power steering device for motor vehicles such as tractors, trucks, pleasure cars, etc., and, of course for many other uses.

One object of this invention is to produce a control device of such construction that any force that tends to move the controlled piston will be automatically opposed and will immediately return it to the desired set position.

A further object is to produce a device in which the piston functions as a shock absorber and yields to a force suddenly applied but is automatically retured to the set or desired position after the force has been absorbed.

A still further object is to produce a device for the purpose described which consumes very little energy until a change in the setting is required.

Another object is to produce a device that, when the parts are at rest, all of the valves in the pump circuit are open and which requires only a small force to operate it because it employs balanced valves.

Another object is to produce a device having a precision movement control that will always give the same positive movement of the piston for the same movement and/or setting of the control lever; and A further object is to produce a device that is not affected by vibration or location and which can be attached in any position.

The above and any other objects to which attention may be called or which become apparent as the description proceeds are attained by means of a construction and an arrangement of parts that will now be described in detail, for which purpose reference will be had to the accompanying drawings in which the invention has been illustrated and in which Figure 1 is a section taken on line 1—1, Figure 2 and shows the relation of the parts in rest position;

Figure 2 is a section taken on line 2—2, Figure 1;

Figure 3 is an elevational view looking upwardly in Figure 1;

Figure 4 is a diagram showing the relationship of the parts in their normal position of rest;

Figure 4a is a fragmentary detail looking in the direction of arrow 4a, Figure 4;

Fig. 4b is a fragmentary detail of the connecting linkage.

Figure 5 is a section through the valve at the left in Figure 1 and is taken on line 5—5, Figures 1 and 4;

Figure 6 is a section through the valve at the right in Figure 4 and is taken on line 6—6, Figures 1 and 4;

Figure 7 is an end elevational view taken on line 7—7, Figure 4 and

Figure 8 is a section similar to that shown in Figure 6 and shows the valve in closed position.

Figure 1 is a view partly in section and reference numeral 10 designates the housing which has a removable cover or closure 11. Attached to or formed integral with the housing wall at opposite ends of a diameter, are two valves 12 and 13. These valves are identical but are reversed. The specific structure of these valves will be described later. A high pressure pump 14 has been shown above housing 10 in Figure 4 but has not been shown in Figure 1 for lack of space, and an oil sump 15 is positioned below the housing. A motor M has been shown in Figure 4 and operatively connected to the pump by a belt 16 or other equivalent means. Reference numeral 17 represents a hydraulic ram cylinder; 18 designates the piston and 19 the piston rod. At the right hand end of the piston rod is a coupling device comprising a block 20, a pivot 21 and a connecting rod 23. The other end of the piston rod comprises a section 24 of gear teeth forming a rack with which is operatively associated a pinion 25. The ends of the cylinder are closed by identical cylinder heads 26L and 26R which are held in place by a plurality of bolts or rods 27. Each cylinder head has a diametrical opening 28 that communicates with the interior of the cylinder through opening 29.

Attention will now be directed principally to Figures 1, 2, 3, 5 and 6 and Figure 8. Referring now to Figure 2 it will be seen that shaft 30 is journaled in an anti-friction bearing 31 in the bottom of the housing and is rotatable in the tubular shaft 32 which in turn is journaled in an anti-friction bearing 33 in cover 11. Control handle 34 is splined to the tubular shaft and is provided at its outer end with a knob 35. A carrier and cam plate 36 is mounted on shaft 30 for free rotation thereon. A flexible shaft 37 of any suitable construction connects shaft 30 with the shaft of pinion 25 as shown diagramatically in Figure 4. This specific transmission means is intended to represent means only and can be replaced when desired by some equivalent means such as a Bowden wire that reciprocates in a tube, or by any suitable electric means such as a Selsyn motor, etc.; the object being to transmit from the piston rod to shaft 30 a movement that will produce an angular movement of shaft 30 that is proportional to the longitudinal movement of the piston rod. Plate 36 has pivotally connected therewith at least one and preferably three pinions 38 that are spaced 120 degrees apart for symmetry. A spur gear 39 is splined to shaft 30 and is in mesh with all of the pinions 38. An internal ring gear 40 is either formed integral with shaft 32 or is a separate gear pinned to shaft 32 so as to rotate therewith. The peripheral edge of carrier plate 36 has two arcuate cam surfaces 41 and 42 of different radii and these are joined by inclined cam surfaces 43 so positioned that the valve plungers 44 may both rest on surface 42 at the same time. Since it is desirable to have the valve plungers at diametrically opposite points, surface 42 should extend through an angle slightly greater than 180 degrees and the inclines 43 may be as steep or abrupt as desired.

Valves 12 and 13 will now be described. Since the two valve structures are identical and are merely reversed, the several parts will be designated by the same referenec numbers. Each valve body has two openings 45 and 46 that intersect at right angles as shown in Figure 1 and a third opening 47, the latter being on the under side when viewed as in Figures 1, 3 and 4 (Figures 5 and 6). The outer end of opening 46 is slightly enlarged, as shown at 48, and the outer end thereof is closed by a screw plug 49. A helical compression spring 50 is positioned in the enlarged section and is held in slightly compressed condition between plug 49 and the slidable disk 51 which rests on the shoulder. Slidable in opening 46 is a valve plunger 44 that has a section 52 of reduced diameter that is in alignment with opening 45 when the parts are in the position shown in Figures 1, 5 and 6, permitting a free fluid passage through opening 45. The valve plunger has either a fluted section or a section 53 of reduced diameter that permits fluid to flow from opening 47 into the housing. The other sections of the plunger have a sliding fit in the opening so that when it is moved to the position shown in Figure 8, by the action of the cam surface 43, no liquid can flow through openings 45 and/or opening 47.

Referring now principally to Figures 1 and 4, it will be seen that the outlet port of pump 14 is connected with passages or openings 45 in valves 12 and 13 by conduits 54 and that the other or lower ends of openings 45 in valves 12 and 13 are connected respectively with the upper ends of passages 28 in the left and the right hand cylinder end caps 26L and 26R by conduits 55 and 56 respectively. The lower or discharge ends of openings 28 in cylinder heads 26L and 26R are connected with the openings 47 in valves 13 and 12 respectively by conduits 57 and 58. Particular attention is called to the reverse arrangement just described and which is shown in Figure 4, because it is an important feature of simplification.

*Operation*

Let us now assume that cylinder 17 is attached to an automobile chassis and that connecting rod 23 is connected with the steering gear for the front wheels (this is merely for purpose of illustration) and we will further assume that the vehicle travels forwardly in a straight line. Pump 14 discharges into conduits 54 and the fluid flows through valves 12 and 13, downwardly when viewed in Figures 1 and 4. Since passages 45 are unobstructed when the parts are positioned as in Figure 4, the fluid flows through conduit 55 and 56, through passages 28 and thence through conduits 57 and 58, through openings 47 in valves 12 and 13 to the interior of housing 10, into a sump 15 and from thence through conduit 59 to the intake port of the pump. If the operator wants to turn towards the right he moves handle 34 towards the right; this turns internal ring gear 40. Since pinion 39 is keyed to shaft 30 it is at this instant stationary but since the three pinions 38 are pivotally attached to the carrier plate 36, the latter also turns clockwise, and cam 43 at the right moves the valve plunger 44 to the position shown in Figure 8, closing all of the passages in valve body 13. The valves in valve body 12 remain open. Fluid from the pump, since it cannot return to the housing through conduit 57, enters the left end of the cylinder and moves the piston towards the right. The fluid that is displaced from in front of the moving piston flows through conduit 58 to the interior of the housing and flows from thence to the pump. In the absence of other means piston 18 would continue its movement towards the right until the passages on valve 13 were reopened by returning the carrier plate and the cams to the position shown in Figure 1. With this arrangement handle 34 would serve only as a valve handle and not as an indicator. It is necessary that means be provided to stop the movement of the piston at whatever point the handle is set to and this means will now be described. Referring now in particular to Figures 2 and 4 it will be observed that the end of shaft 30 towards the left in Figure 2 terminates in a universal joint 60 which serves to connect one end of flexible shaft 37 with shaft 30. The flexible shaft has been indicated by a curved line in Figure 4 and its other end is connected with shaft 61. It is now evident that when the piston moves it causes pinion 25 to turn and this rotary motion is transmitted to shaft 30 and to carrier plate 36 by the flexible shaft. The parts are so arranged that when handle 34 is moved clockwise to close the passages through valve 13 and the piston moves in response thereto the movement of the piston towards the right will cause the carrier plate to turn counter-clockwise until it reassumes the position shown in Figure 1, whereupon further movement of the piston will cease. Since the pressure on both sides of the piston is now equivalent, it will retain the position corresponding to that of the handle 34. When handle 34 is moved counter-clockwise it will close the passages through valve body 12 and produce a movement of the piston in the opposite direction as above explained.

Let us now assume that the vehicle is traveling forwardly in a straight line and one of the wheels strikes an obstruction that tends to turn it. Since the piston is freely movable it may permit the wheel to turn slightly about its vertical spindle and this will then move the piston. When the piston moves the movement is transmitted to the carrier plate 36 which then operates one of the valves and causes pressure to be exerted on the piston in a direction to return it to the desired position.

What is claimed as new is:

A valve mechanism for controlling the direction and extent of movement of a hydraulic motor of the piston and cylinder type; comprising a closed housing having a bottom and a removable cover, a first shaft journaled in the cover, the end of the shaft within the housing having an internal gear attached thereto, the outer end having a handle, a second shaft journaled in the bottom in axial alignment with the first shaft, a spur gear attached to the second shaft in coplanar relation to the internal gear, a cam plate rotatably mounted on the second shaft in position to close the open side of the internal gear, at least one pinion pivotally attached to the inner surface of the cam plate in meshing relation to the spur gear and the internal gear, the edge of the cam plate having two concentric arcuate surfaces of different radii joined by inclined cam surfaces, two plunger type valves carried by the wall of the housing, the plunger of each valve projecting into the housing into engagement with the arcuate peripheral edge portions of the cam plate, spring means urging the plungers into engagement with the edge of the cam plate whereby they will be reciprocated when passing over the cam surfaces from one arcuate section to the other the valves being open when the plungers are in contact with one of the arcuate surfaces and closed when in contact with the other arcuate surface the valves being so positioned with respect to the arcuate surfaces that both valves will be held in open position when the plungers are in contact with the same arcuate section and will be moved to closed position by the action of the cam surface in passing from one arcuate surface to the other, said second shaft forming part of a means adapted to be operatively connected with the hydraulic motor to return the cam plate to neutral position.

References Cited in the file of this patent

UNITED STATES PATENTS

| | | |
|---|---|---|
| 951,161 | Watrous | Mar. 8, 1910 |
| 1,083,810 | Engberg | Jan. 6, 1914 |
| 1,414,654 | Lang | May 2, 1922 |
| 2,105,473 | Dean | Jan. 18, 1938 |
| 2,261,444 | Neubert, Jr. | Nov. 4, 1941 |
| 2,341,940 | Millington | Feb. 15, 1944 |
| 2,363,179 | Harrington et al. | Nov. 21, 1944 |
| 2,383,278 | Stevens | Aug. 21, 1945 |
| 2,387,896 | Giger | Oct. 30, 1945 |
| 2,608,263 | Garrison | Aug. 26, 1952 |